United States Patent Office 3,439,562
Patented Apr. 22, 1969

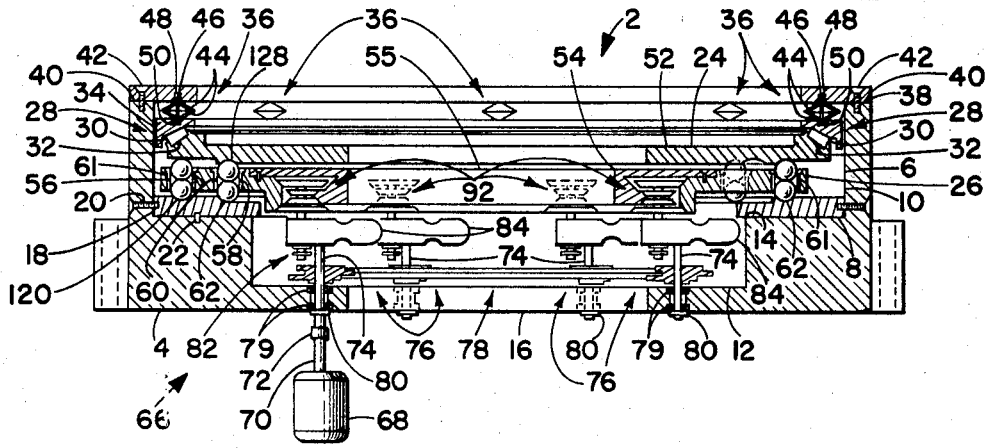
FIG 2
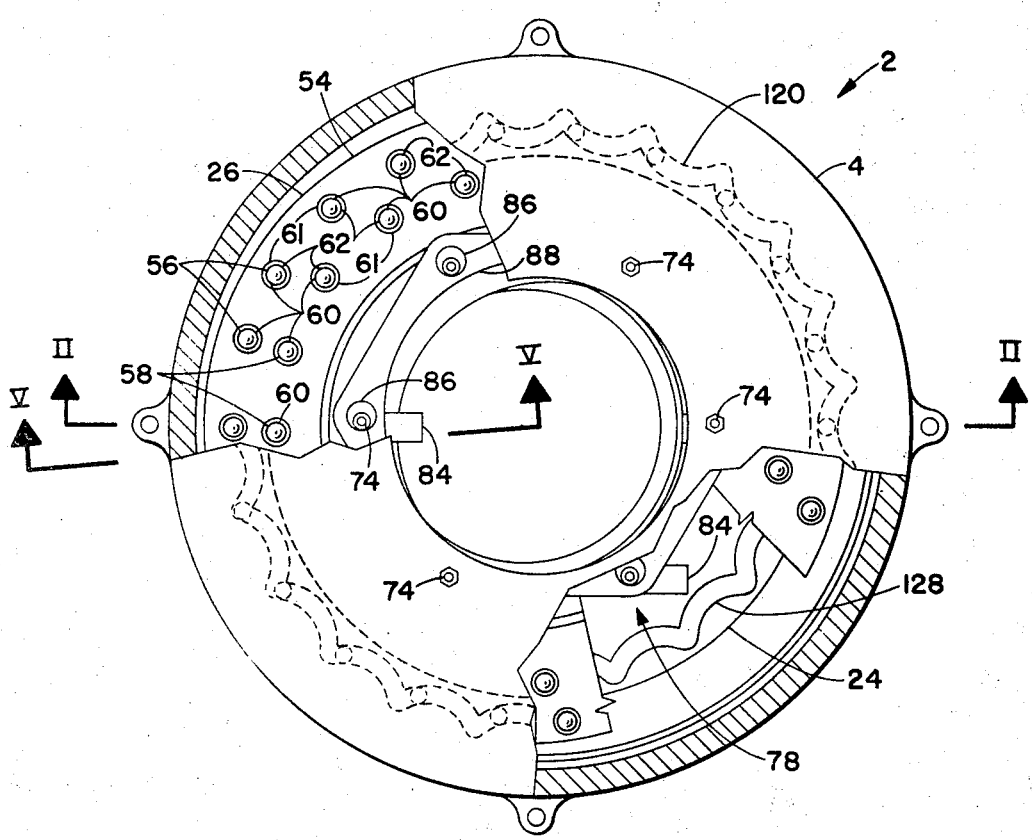
FIG I
THOMAS F. BICKLEY
INVENTOR
BY John Paul Robinson Jr.
ATTORNEY THOMAS F. BICKLEY
INVENTOR
BY John Paul Robinson Jr.
ATTORNEY

3,439,562
SPEED-CHANGE MECHANISM
Thomas F. Bickley, Arlington, Tex., assignor to LTV
 Aerospace Corporation, Dallas, Tex., a corporation of
 Delaware
Filed July 3, 1967, Ser. No. 650,883
Int. Cl. F16h 1/28, 57/00
U.S. Cl. 74—804               28 Claims

ABSTRACT OF THE DISCLOSURE

A self-compensating speed-change assembly for substantially eliminating all backlash or lost motion between relative rotating members including a first member and a second member positioned in spaced, opposed relationship about a common axis, and with one member mounted for axial displacement relative to the other member. A torque transmitting mechanism is disposed between the first and second members and operatively engages both of said members for rotating at least one of said members, at a different angular velocity, relative to the torque transmitting mechanism. In addition, means are provided for constantly urging one of the members toward the other member for substantially eliminating all backlash between the torque transmitting mechanism and the first and second members; thus, allowing the speed-change assembly to automatically compensate for normal wear.

---

The invention relates to power transmission mechanisms and more particularly to a speed-change assembly employing a torque transmitting device, operatively associated with a plurality of gear members, for rotating at least one of the members at a desired angular velocity.

In the past, continuous and extensive efforts have been expended to develop anti-backlash speed-change mechanisms with varying degrees of success. A serious disadvantage of many of these prior-art, speed-change mechanisms is they are complex, expensive, and are fully effective only when in motion, and then only if turning in the right direction. In addition, the rate of wear between complementary gear members in such prior-art speed-change mechanisms, is greatly increased, even under normal or ordinary working loads.

The primary object of the present invention is concerned with the provision of a new and improved anti-backlash, self-compensating, rugged, simplified, compact speed-change assembly designed to sustain the repeatedly violent shocks to which it is subjected, as the design of the improved anti-backlash speed-change mechanism greatly reduces the magnitude of any shock that is imposed thereon.

Another object of the present invention is to provide a speed-change assembly having an access passageway and/or manway centrally disposed therein for permitting the running of conduits, electromagnetic wave guides and/or the passage of operating personnel therethrough.

In the drawing:
FIGURE 1 is a plan view, partly in section, of the speed-change mechanism embodying the present invention.

FIGURE 2 is a sectional view, taken along line II—II, of FIG. 1.

Figure 4:
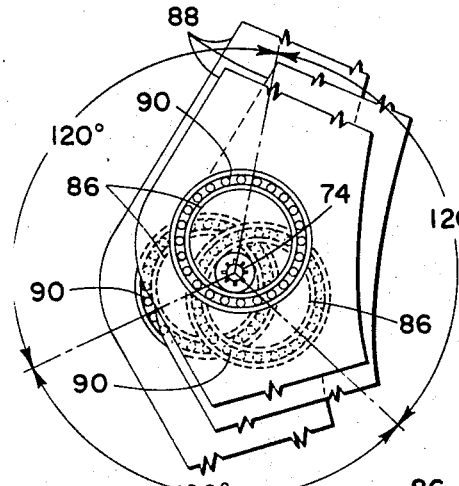
FIGURE 4 is a fragmentary enlarged plan view showing the eccentric drive of the tensional-drive, coordinator mechanism.

Certain terminology will be used in the following description for convenience in reference only and is not intended to be limiting. The words "upwardly," "downwardly," "rightwardly," and "leftwardly" will designate directions in the drawing to which reference is made. The words "inwardly" and "outwardly" will refer to directions toward and away from, respectively, a geometric axis of the speed-change mechanism. The words "cycloid" and "cycloidal" are intended to refer to "epicycloid" or "hypocloid." Such terminology will include, the words specifically mentioned, derivatives thereof and words of similar import.

For the purpose of disclosure, of the anti-backlash, self-compensating, speed-change assembly embodying the present invention, reference is now made to FIG. 2 which shows the speed-change assembly 2 including a fixed or stationary housing 4 that is generally connected to suitable supporting structure (not shown). Housing 4 is provided with an inner surface or lateral wall portion 6 that is structurally interconnecting or associated with a bottom wall portion 8, for defining an upwardly opening cavity 10, that is constructed and arranged to receive and surround the speed-change assembly 2. A well 12 extends from the inner edge 14, of bottom wall portion 8, to a passageway 16 which is substantially aligned with the geometric axis of the speed-change assembly 2. A first cycloidal gear member 18 is detachably secured to housing 4 by conventional fasteners 20. A plurality of concentrically arranged pins 22 depend from first member 18 and are snugly, yet slidably received in complementary openings in the bottom wall 8; thereby, preventing relative rotation between the housing 4 and first member 18. However, under some circumstances and for some applications, it may be found desirable to support the first member 18 for rotation relative to housing 4, for example, in the case of a dual or compound drive unit. A second cycloidal gear member 24 is disposed in an axially spaced, opposed relationship relative to the first member 18. The housing 4, first member 18, and second member 24, are substantially disposed about a common axis which generally coincides with the geometric axis of the speed-change assembly 2. A torque transmitting mechanism 26 is positioned interjacent the first and second members, 18 and 22, respectively, in an opposed driving relationship with respect to the first and second members. A bearing assembly 28 that includes a plurality of inwardly converging, tapered, roller bearings 30, is disposed between complementary inner and outer raceway members 32 and 34. The inner raceway 32 is integral with and positioned about the outer peripheral edge portion of second member 24, and outer raceway 34 is slidably received in cavity 10 and is spaced from and in opposed relationship relative to inner raceway 32, to provide a continuous bearing pathway thereabout. A plurality of Belleville spring units 36 is positioned between the outer surface of outer raceway 34 and the inner surface of inwardly extending flange member 38, that is fixedly secured to the outer edge 40 of housing 4 by suitable fasteners 42. Each spring unit 36 has at least a pair of aligned Belleville springs 44 in opposed relationship and a spring retaining pin 46 is received in and extends through the aligned apex openings in the springs 44. Opposite ends of pin 46 are slidably received in complementary aligned openings 48 and 50, that are disposed in flange member 38 and outer raceway 34, respectively. The spring units 36 function as a means for constantly urging the second member 24 toward the first member 18; thereby, substantially eliminating all backlash or lost motion between the torque transmitting mechanism 26 and the first and second members 18 and 24 due to the configuration and arrangement of the respective members. Also, a positive driving engagement is effected between the first and second members 18 and 24. Should it be desirable to mount a large structure, such as, a rotatable radar dome, on the speed-change assembly 2; the second member 24 would generally be horizontally positioned and the structure (not shown) would be mounted on the outer side 52. Thus, by utilizing such an arrangement, the springs 44 may be eliminated or reduced in strength, as the weight of such a radar dome and/or associated structure would be sufficient to constantly urge the second member 24 toward the first member 18, thereby, substantially eliminating all backlash and lost motion between the component parts of speed-change assembly 2.

The torque transmitting mechanism 26, that is mounted between the first and second members 18 and 24 includes a rotatable thrust member 54 that has a longitudinal axis substantially parallel to the common axis of the first and second members 18 and 24. Thrust member 54 has a passageway 55 extending therethrough and in a substantially aligned relationship with passageway 16, of housing 4, for allowing access from one side to the other thereof. The thrust member 54 has a first series 56 and a second series 58 of substantially concentrically arranged openings 60 defined by replaceable liners 61, which extend completely therethrough. The mean diameter of the first series 56 of concentrically arranged openings 60 is greater than the mean diameter of the second series of concentrically arranged openings 60. Each opening 60 is constructed and arranged to rotatably receive a plurality of torque transmitting members or balls 62, in revolving contact with each other. The diameter of each opening 60 is at least equal to the diameter of the respective complementary balls disposed therein, for permitting each ball 62 to rotate about its own axes; however, the sum of the diameters of the balls 62, disposed in each opening 60, is greater than the axial width 64 of thrust member 54. Thus, a portion of the balls 62 extend outwardly from opposite sides of thrust member 54, for engaging complementary gear teeth on the first or second cycloidal gear member 18 or 24. Preferably, the balls 62 have the same diameters. However, thrust balls of different diameters may be disposed within openings 60; likewise, the openings 60 may vary in diameter to accommodate different ball diameters.

Figure 3:
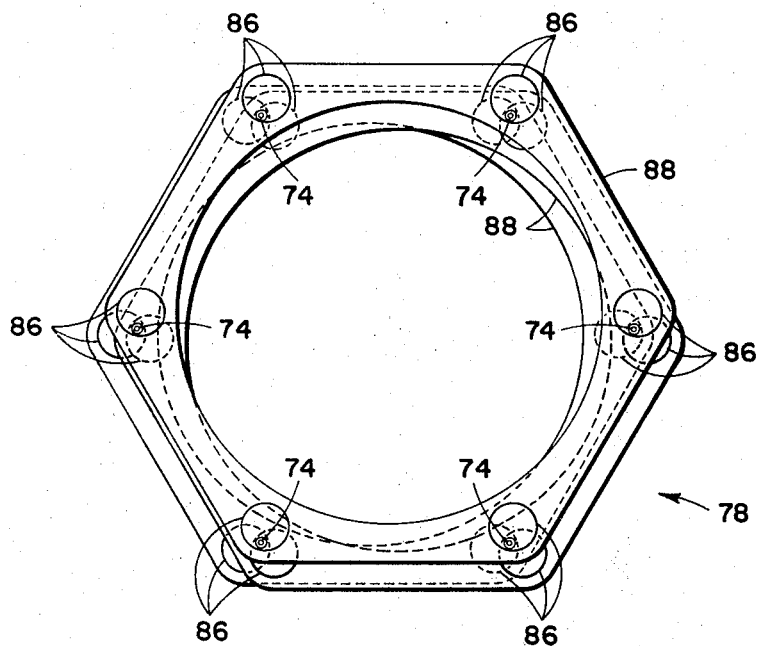
FIGURE 3 is a plan view illustrating the tensional-drive, coordinator mechanism that provides a synchronous driving torque for the present invention.

The thrust member 54 has imparted thereto a rotating and eccentric movement, by means of drive mechanism 66. The drive mechanism 66 has a prime mover 68, for example, an electric motor for rotating the prime mover output shaft 70 in at least one direction, at a predetermined angular velocity. The output shaft 70 is drivingly connected, through a suitable coupling 72, to the input shaft 74, of one, of several torque transmitting drive units 76, that are substantially concentrically disposed about and drivingly connected to thrust member 54. The input shafts 74, of the several torque transmitting drive units 76, are drivingly interconnected by a tensional-drive, coordinator mechanism 78, as illustrated in FIG. 3, for providing a substantially synchronous driving torque simultaneously to all input shafts 74, of the several drive units 76. The rotatable, prime mover, output shaft 70 (FIG. 2) is preferably eccentrically disposed relative to the geometric axis of the speed-change assembly 2. Each input shaft 74 has one end portion rotatably journaled, by suitable bearings 79, in housing 4 and a conventional retaining ring 80 restrains axial movement of shaft 74 in one direction. The opposite end portion of each shaft 74, is fixedly connected to an eccentric torque transmitting drive unit 82 that has a balancing weight or mass 84 integral therewith, for the purpose of dynamically balancing thrust member 54. Hence, rotation of each shaft 74 causes the associated drive unit 82 and balancing mass 84 to revolve about the shaft 74. Preferably, at least three similar eccentric members 86, as illustrated in FIG. 4, are fixedly secured, by conventional splines, to each shaft 74 for rotation therewith at a common speed. Each eccentric member 86 on each shaft 74, is offset a uniform angular distance, approximately 120 degrees, relative to the other two eccentric members for effecting an out of phase relationship therebetween. At least three, axially spaced, connecting members 88 are rotatably journaled, by bearings 90, to complementary corresponding eccentric members 86, on each drive unit 76, for imparting a constant tensional driving force thereto, for rotating each drive unit 82 (FIG. 2) at a predetermined angular velocity.

Figure 5:
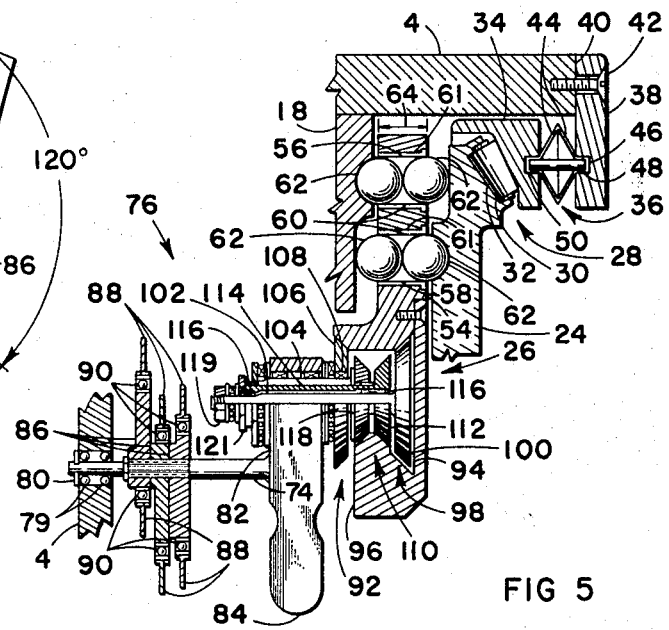
FIGURE 5 is an enlarged fragmentary cross-sectional view, taken along line V—V, of a torque transmitting drive unit employed to rotate and eccentrically move the torque transmitting mechanism of the present invention.

The thrust member 54, as shown in FIG. 5, is rotatably supported on a plurality of adjustable roller mechanisms 92 positioned in driving relationship with continuous, annular, groove 94 that is concentrically disposed in a wall portion 96 of thrust member 54. Each roller mechanism 92 includes a first roller assembly 98 having a first conical roller 100. An elongate, cylindrical shaft 102 extends outwardly from roller 100 and is received within the bore of a bearing 116. The second conical roller 106 is rotatably mounted by bearings 108 on the external surface of bushing 104. A second roller assembly 110 is disposed interjacent the first and second conical rollers 100 and 106. The first and second roller assembly 98 and 110 are constructed and arranged, as shown in FIG. 5, to simultaneously rotate about a common axis. The second roller assembly 110 includes a first conical roller 112 that has an elongate, hollow, cylindrical shaft 114 secured thereto. Shaft 114 is received within the bore of bushing 104, between the inner wall of bushing 104 and the outer surface of shaft 102. A second conical roller 118 is splined to shaft 114 for rotation therewith at a common speed. The complementary splines on shaft 114 are of sufficient length to permit axial movement of the second conical roller 118 relative to first conical roller 112; thereby, allowing the effective diameter of roller assembly 110 to be readily adjusted, to compensate for various manufacturing conditions. To adjust roller assembly 98, the internally threaded adjusting nut 119 that threadedly engages complementary threads on the outer end portion of shaft 102 is rotated in one or another angular direction, to effect an axial movement of conical rollers 100 and 106 relative to each other, for adjusting the effective diameter thereof. Likewise, rotation of internally threaded, adjusting nut 121, that threadedly engages complementary threads on the outer end portion of hollow shaft 114, effects an axial movement of conical rollers 112 and 118 relative to each other, for adjusting the effective diameter thereof. The first and second conical rollers of each roller assembly 98 and 110 are disposed in opposed relationship. An inwardly inclined surface is disposed adjacent the periphery of each first and second conical roller, of each roller assembly 98 and 110 for effecting a driving relationship with complementary inclined wall portions of groove 94, for rotating the torque transmitting mechanism 26.

Figure 6:
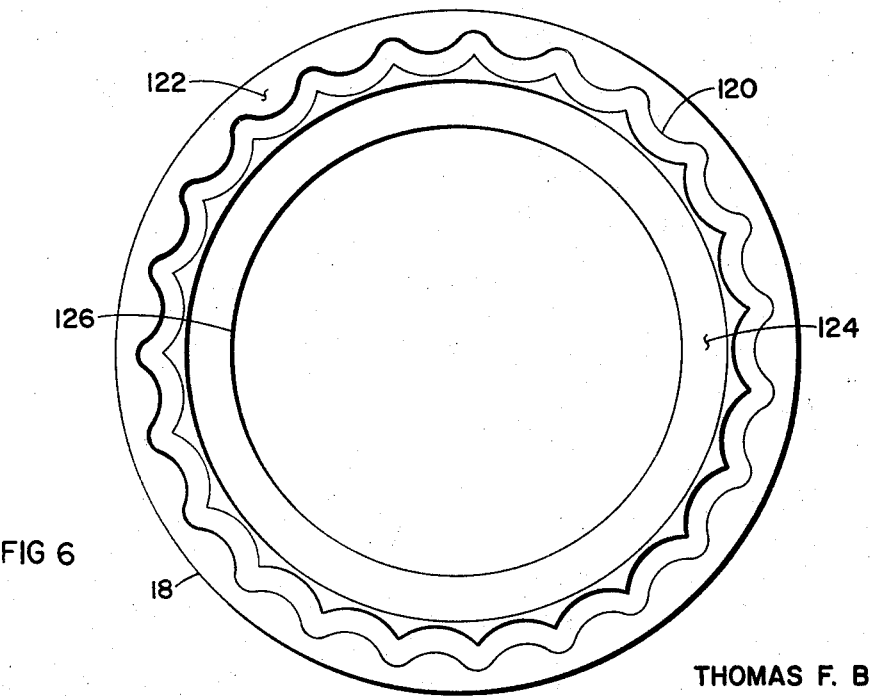
FIGURE 6 is a plan view of the first gear member.

FIG. 6 is a plan view of the first gear member 18. A plurality of cycloidal gear teeth 120 are concentrically disposed on an inwardly-facing, radially extending surface 122, which is positioned about the center axis of member 18. An inner recess portion 124 provides a reaction or bearing pathway for some of the torque transmitting balls 62. The mean diameter of cycloidal gear teeth 120 is substantially equal to the mean diameter of the first series 56 to torque transmitting balls 62 for operative engagement therewith. A passageway 126 is disposed about the center axis of member 18 and extends therethrough.

Figure 7:
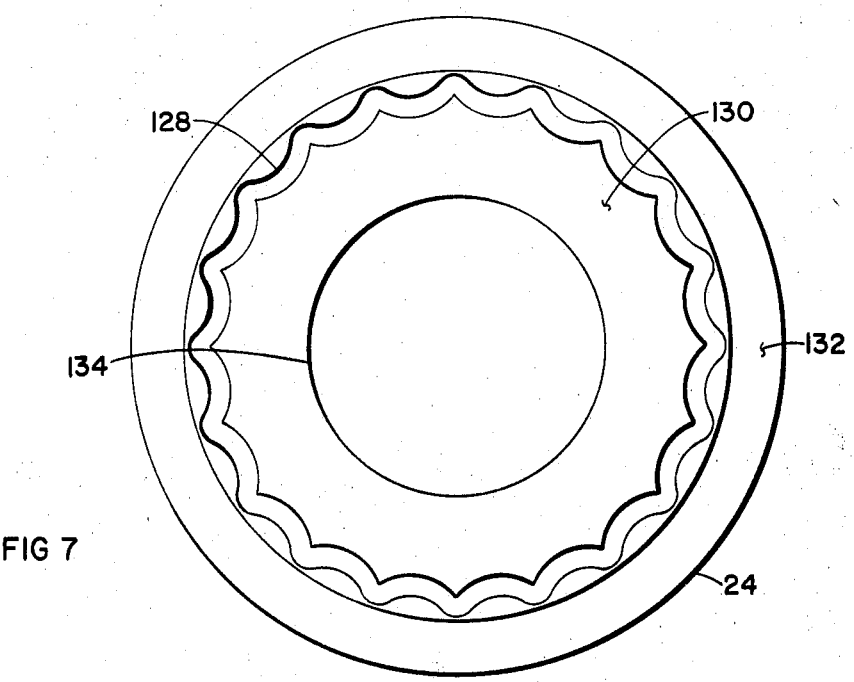
FIGURE 7 is a plan view of the second gear member.

FIG. 7 is a plan view of the second cycloidal gear member 24 with a plurality of cycloidal gear teeth 128 concentrically disposed on an inwardly-facing, radially extending surface 130 which is positioned about the center axis of member 24. An outer recess portion 132 functions as a reaction or bearing pathway for some of the torque transmitting balls 62. The mean diameter of cycloidal gear teeth 128 is substantially equal to mean diameter of the second series 58 of torque transmitting balls 62 for engagement therewith. A passageway 134 is disposed about the center axis of member 24 and extends therethrough.

It is to be noted, that in the preferred embodiment, the grooves forming cycloidal gear teeth 120 and 128, as shown in FIGS. 6 and 7, are continuous and coaxially arranged about the center of both gear members 18 and 24. Also, gear member 18 has a greater number of cycloidal gear teeth than gear member 24.

In operation, as shown in FIG. 1, either or both members 18 and 24, has imparted thereto a gyrating-type of movement by means of drive mechanism 66, that is drivingly interconnected to a plurality of torque transmitting drive units 76 which simultaneously rotates and thus eccentrically moves the torque transmitting mechanism 26. The first series 56 of torque transmitting balls 62 engage cycloidal gear teeth 120, on first gear member 18, and the second series 58 of torque transmitting balls 62 engage cycloidal gear teeth 128, and second gear member 24. Spacing between the individual torque transmitting balls 62, as illustrated in FIG. 1, is such, that they are located in a different part of their respective cycloidal gear section, in which they are positioned. That is, one ball 62 may be at the peak of a cycloidal gear section while the next adjacent ball 62, in a clockwise direction, is approaching the peak of the cycloidal gear section, in which it positioned. Continuing in a clockwise direction, another ball 62 is approximately halfway between the peak and base of its respective cycloidal gear, and some ball 62 has just passed the base of the cycloidal gear section. Therefore, rotation of torque transmitting mechanism 26 moves torque transmitting balls 62 into engagement with the cycloidal gear teeth on both the first and second gear members 18 and 24. Since there is a differential in the number of gear teeth on gear members 18 and 24, one or both gear members may rotate at an angular velocity that is different from the angular velocity of the torque transmitting mechanism 26.

From the above description, it is readily apparent a new and unobvious self-compensating, anti-backlash, speed-change mechanism has been developed. One particularly advantageous feature of this device is that in the assembled position, as shown in FIG. 2, the passageways 16, 126, and 134 are disposed in an aligned relationship, about a common axis, that generally coincides with the geometric axis of speed-change assembly 2, and passageway 55 is in a substantially aligned relationship with passageways 16, 126, and 134; thereby, defining a continuous passageway extending completely through a center portion of the speed-change assembly 2.

While only one embodiment of the invention, together with modifications thereof, have been described in detail herein and shown in the accompanying drawing, it will be evident that various further modifications are possible in the arrangement and construction of its components without departing from the scope of the invention.

What is claimed is:

1. A self-compensating speed-change assembly comprising:
   a first member and a second member disposed in spaced, opposed relationship about a common axis;
   a torque transmitting mechanism disposed interjacent the first and second members;
   means for rotatably supporting the torque transmitting mechanism in a substantially opposed relationship with respect to both the first and second members for permitting rotation of the torque transmitting mechanism relative to said supporting means;
   means for effecting the eccentric rotation of the torque transmitting mechanism supporting means, relative to the first member, at a predetermined angular velocity, for effecting the eccentric rotation of said torque transmitting mechanism;
   the torque transmitting mechanism having means operatively engaging both the first and second members for rotating said second member at a different angular velocity than the predetermined angular velocity; and
   means for supporting the second member for both axial displacement and rotary movement relative to the first member, including means constantly urging the second member toward the first member for substantially eliminating all backlash between the torque transmitting mechanism and the first and second members, and for effecting a positive driving engagement between said members and the torque transmitting mechanism, thus allowing the speed-change assembly to automatically compensate for normal wear and dimensional variations within standard manufacturing practices, and run-in wear associated with manufacturing.

2. The self-compensating speed-change assembly recited in claim 1, wherein the second member is provided with a plurality of concentrically arranged cycloidal gear teeth fixedly attached thereto;
   the first member having a plurality of concentrically arranged cycloidal gear teeth secured thereto, said first member having a different number of gear teeth than the second member;
   a first series of concentrically arranged torque transmitting members carried by the torque transmitting mechanism, said torque transmitting members engaging the cycloidal gear teeth on the first member; and
   a second series of concentrically arranged torque transmitting members carried by the torque transmitting mechanism, said second series of torque transmitting members engaging the cycloidal gear teeth on the second member.

3. The self-compensating speed-change assembly recited in claim 2, wherein the mean diameter of the first series of concentrically arranged torque transmitting members is substantially equal to the mean diameter of the concentrically arranged cycloidal gear teeth on the first member; and
   the mean diameter of the second series of concentrically arranged torque transmitting member is substantially equal to the mean diameter of the concentrically arranged cycloidal gear teeth on the second member.

4. The self-compensating speed-change assembly recited in claim 3, wherein the mean diameter of the first series of torque transmitting members is different from the mean diameter of the second series of torque transmitting members.

5. The self-compensating speed-change assembly recited in claim 1, wherein the second member is provided with an inwardly facing radially extending surface concentrically disposed about the common axis, said surface having a plurality of concentrically arranged cycloidal gear teeth secured thereto;
   the first member having an inwardly facing, radially extending surface concentrically disposed about the common axis, said surface having a plurality of concentrically arranged cycloidal gear teeth fixedly attached thereto, said first member having a different number of cycloidal gear teeth than the second member;
   a first series of concentrically arranged torque transmitting members carried by the torque transmitting mechanism, said torque transmitting members engaging the cycloidal gear teeth on the first member; and
   a second series of concentrically arranged torque transmitting members carred by the torque transmitting mechanism, said second series of torque transmitting members engaging the cycloidal gear teeth on the second member.

6. The self-compensating speed-change assembly recited in claim 1, said transmitting mechanism includes:
   a rotatable thrust member having a longitudinal axis substantially parallel to the common axis, said thrust member having a first and a second series of spaced, concentrically arranged openings extending therethrough; and
   a plurality of torque transmitting balls, in revolving contact with each other, rotatably disposed within each of the openings, said balls operatively engaging the first and second members for rotating said second member at a different angular velocity than the predetermined angular velocity.

7. The self-compensating speed-change assembly recited in claim 6, wherein each of said openings have a diameter at least equal to the diameter of the respective balls for permitting each ball to rotate about its own axes.

8. The self-compensating speed-change assembly recited in claim 6, wherein the mean diameter of the first series of concentrically arranged openings is greater than the mean diameter of the second series of concentrically arranged openings.

9. The self-compensating speed-change assembly recited in claim 1, said means for effecting eccentric rotation of the torque transmitting mechanism supporting means comprising:
   a rotatable drive shaft drivingly connected to the torque transmitting mechanism, said shaft having its longitudinal axis eccentrically disposed relative to the geometric axis of the speed-change assembly; and
   means for rotating the drive shaft in at least one direction, at a predetermined angular velocity.

10. The self-compensating speed-change assembly recited in claim 9, said means for effecting eccentric rotation of the torque transmitting mechanism supporting means includes a tensional-drive, coordinator mechanism for providing a substantially synchronous driving torque to a plurality of torque transmitting drive units.

11. The self-compensating speed-change assembly recited in claim 10, wherein at least three torque transmitting drive units are angularly spaced about the torque transmitting mechanism, with at least one of said torque transmitting drive units drivingly connected to the rotatable drive shaft for rotation therewith at a common speed;
   the tensional-drive, coordinator mechanism includes at least three eccentrics fixedly connected to each torque transmitting drive unit for rotation therewith at the same angular velocity, each eccentric being offset a uniform angular distance relative to the other eccentrics for effecting an out of phase relationship therebetween; and
   at least three, spaced, connecting members drivingly interconnecting corresponding eccentrics on each drive unit for imparting a constant tensional driving force thereto, for rotating each torque transmitting drive unit at the predetermined angular velocity.

12. The self-compensating speed-change assembly recited in claim 1, said means for effecting eccentric rotation of the torque transmitting mechanism supporting means includes a tensional-drive, coordinator mechanism for providing a substantially synchronous driving torque to a plurality of torque transmitting drive units.

13. The self-compensating speed-change assembly recited in claim 12, wherein each torque transmitting drive unit includes:
   a first means coacting with the tensional-drive, coordinator mechanism for moving the torque transmitting mechanism eccentrically; and
   a second means coacting with the first means in response to eccentric movement of said first means for rotating the torque transmitting mechanism.

14. The self-compensating speed-change assembly recited in claim 6 wherein a pair of torque transmitting balls, in revolving contact with each other, is disposed within each of the openings, and the sum of the diameter of each pair of balls being greater than the axial width of the rotatable thrust member.

15. The self-compensating speed-change assembly recited in claim 1 further including:
   a fixed housing having a chamber adapted to receive the first member; and
   means for fixedly securing the first member within the chamber.

16. The self-compensating speed-change assembly recited in claim 1, wherein the first member has a passageway extending therethrough and substantially aligned with the common axis;
   the second member having a passageway extending therethrough and substantially aligned with the common axis; and
   the torque transmitting mechanism having a passageway extending therethrough and in substantially aligned relationship with the passageways in both the first and second members for allowing access from one side to the other of the speed reducer assembly, through a central portion thereof.

17. A self-compensating speed-change assembly comprising:
   a first member and a second member disposed in spaced, opposed relationship about a common axis;
   means for supporting at least one of said members for both axial displacement and rotary movement relative to the other member;
   a torque transmitting mechanism disposed interjacent the first and second members;
   means for rotatably supporting the torque transmitting mechanism in a substantially opposed relationship with respect to both the first and second members for permitting rotation relative to said members;
   means for effecting eccentric rotation of the torque transmitting mechanism supporting means, relative to the first member, at a predetermined angular velocity for effecting eccentric rotation of said torque transmitting mechanism;
   the torque transmitting mechanism operatively engaging both the first and second members for rotating said second member at a different angular velocity than the predetermined angular velocity; and
   means constantly urging the one of said members toward the other member for substantially eliminating all backlash between the torque transmitting mechanism and said members, and for effecting a positive torque transmitting engagement between said members and the torque transmitting mechanism, thus allowing the speed-change assembly to automatically compensate for normal wear and dimensional variations within standard manufacturing practices.

18. A self-compensating speed-change assembly comprising:
   a first member and a second member disposed in spaced, opposed relationship about a common axis;
   means for supporting at least one of said members for both axial displacement and rotary movement relative to the other members;
   a torque transmitting mechanism disposed interjacent the first and second members;
   means for rotatably supporting the torque transmitting mechanism in a substantially opposed relationship with respect to both the first and second members for rotation relative to said members;
   means for effecting eccentric rotation of the torque transmitting mechanism supporting means, relative to the first member, at a desired angular velocity, for effecting eccentric rotation of said torque transmitting mechanism;
   means operatively coacting with the torque transmitting mechanism for rotating the one of said members relative to the torque transmitting mechanism at a different angular velocity, in response to rotary and eccentric movement of the torque transmitting mechanism; and means constantly urging the one of said members toward the other member for substantially eliminating all backlash between the torque transmitting mechanism and said members, and for effecting a positive torque transmitting engagement between said members and the torque transmitting mechanism, thus allowing the speed change assembly to automatically compensate for normal wear and dimensional variations within standard manufacturing practices.

19. A self-compensating speed-change assembly comprising:
a first member and a second member disposed in spaced, opposed relationship about a common axis;
means for supporting the second member for both axial displacement and rotary movement relative to the first member;
a torque transmitting mechanism disposed interjacent the first and second members;
means for rotatably supporting the torque transmitting mechanism in a substantially opposed relationship with respect to both the first and second members for rotation relative to said members;
means for effecting eccentric rotation of the torque transmitting mechanism supporting means, relative to the first member, at a predetermined angular velocity, for effecting eccentric rotation of said torque transmitting mechanism;
the torque transmitting mechanism having means operatively engaging both the first and second members for rotating said second member at a different angular velocity than the desired angular velocity;
the first member having a passageway extending therethrough and substantially aligned with the common axis;
the second member having a passageway extending therethrough and substantially aligned with the common axis; and
the torque transmitting mechanism having a passageway extending therethrough and substantially axially coinciding with the passageways in both the first and second members for allowing access from one side to the other side of the speed-change assembly, through a central portion thereof.

20. The self-compensating speed-change assembly recited in claim 19, said means for effecting eccentric rotation of the torque transmitting mechanism supporting means comprising:
a rotatable drive shaft drivingly connected to the torque transmitting mechanism, said shaft having its longitudinal axis eccentrically disposed relative to the geometric axis of the speed-change assembly; and
means for rotating the drive shaft in at least one direction, at a predetermined angular velocity.

21. The self-compensating speed-change assembly recited in claim 19, wherein the second member has a plurality of concentrically arranged cycloidal gear teeth fixedly attached thereto;
the first member being provided with a plurality of concentrically arranged cycloidal gear teeth secured thereto, said first member having a greater number of gear teeth than the second member;
a first series of concentrically arranged torque transmitting members carried by the torque transmitting mechanism, said torque transmitting members drivingly engaging the cycloidal gear teeth on the first member; and
a second series of concentrically arranged torque transmitting members carried by the torque transmitting mechanism, said second series of torque transmitting members drivingly engaging the cycloidal gear teeth on the second member.

22. The self-compensating speed-change assembly recited in claim 21, wherein the diameter of the first series of concentrically arranged torque transmitting members is substantially equal to the mean diameter of the concentrically arranged cycloidal gear teeth on the first member; and
the diameter of the second series of concentrically arranged torque transmitting members is substantially equal to the mean diameter of the concentrically arranged cycloidal gear teeth on the second member.

23. The self-compensating speed-change assembly recited in claim 22, wherein the diameter of the first series of torque transmitting members is greater than the diameter of the second series of torque transmitting members.

24. The self-compensating speed-change assembly recited in claim 19, wherein the second member is provided with an inwardly facing radially extending surface concentrically disposed about the common axis, said surface having a plurality of concentrically arranged cycloidal gear teeth secured thereto;
the first member having an inwardly facing, radially extending surface concentrically disposed about the common axis, said surface having a plurality of concentrically arranged cycloidal gear teeth fixedly attached thereto, and said first member having a greater number of cycloidal gear teeth than the second member;
a first series of concentrically arranged torque transmitting members carried by the torque transmitting mechanism, said torque transmitting members drivingly engaging the cycloidal gear teeth on the first member; and
a second series of concentrically arranged torque transmitting members carried by the torque transmitting mechanism, said second series of torque transmitting members drivingly engaging the cycloidal gear teeth on the second member.

25. The self-compensating speed-change recited in claim 19, said torque transmitting mechanism includes:
a rotatable thrust member having a longitudinal axis substantially parallel to the common axis, said thrust member having a first and a second series of spaced, concentrically arranged openings extending therethrough; and
a plurality of torque transmitting balls rotatably disposed within each of the openings, each of said opening having a diameter at least equal to the diameter of the respective complementary balls for permitting each ball to rotate about its own center, said balls operatively engaging both the first and second members for rotating said second member at a different angular velocity than the predetermined angular velocity.

26. The self-compensating speed-change assembly recited in claim 19, said means for effecting eccentric rotation of the torque transmitting mechanism supporting means includes a tensional-drive, coordinator mechanism for providing a substantially synchronous driving torque to a plurality of concentrically arranged torque transmitting drive units.

27. The self-compensating speed-change assembly recited in claim 25, wherein a pair of torque transmitting balls is disposed, in contacting relationship, within each of the openings, and the sum of the diameters of each pair of balls being greater than the axial width of the rotatable thrust member.

28. A self-compensating speed-change assembly comprising:
a fixed member and a driven member, disposed in spaced, opposed relationship about a common axis;
means for supporting the driven member for both axial displacement and rotary movement relative to the fixed member;
a torque transmitting mechanism disposed between the fixed member and the driven member;

means for rotatably supporting the torque transmitting mechanism in a substantially opposed, spaced relationship with respect to both the reaction and the driven members for permitting rotation of the torque transmitting mechanism relative to said supporting means;

a rotatable drive shaft drivingly connected to the torque transmitting mechanism;

means for rotating the drive shaft in at least one direction, at a predetermined angular velocity;

means coacting with the drive shaft and the torque transmitting mechanism for moving said torque transmitting mechanism supporting means eccentrically;

means operatively coacting with the torque transmitting mechanism for rotating the driven member relative to said torque transmitting mechanism at a different angular velocity, in response to rotary and eccentric movement of said torque transmitting mechanism supporting means; and means urging the driven member toward the fixed member for substantially eliminating all backlash between the torque transmitting mechanism and the fixed and driven members, and for effecting a positive torque transmitting engagement between said members and the torque transmitting mechanism, thus allowing the speed-change assembly to automatically compensate for normal wear and dimensional variations within standard manufacturing practices.

References Cited

UNITED STATES PATENTS

| | | | |
|---|---|---|---|
| 1,862,220 | 6/1932 | Johnson | 74—804 X |
| 2,508,121 | 5/1950 | McIver | 74—805 X |
| 2,874,594 | 2/1959 | Sundt | 74—805 |
| 3,013,447 | 12/1961 | Hils et al. | 74—805 |
| 3,147,640 | 9/1964 | Musser | 74—804 X |

ARTHUR T. McKEON, *Primary Examiner.*

UNITED STATES PATENT OFFICE
CERTIFICATE OF CORRECTION

Patent No. 3,439,562                              Dated April 22, 1969

Inventor(s)         Thomas F. Bickley

It is certified that error appears in the above-identified patent and that said Letters Patent are hereby corrected as shown below:

Column 5, line 23, the word "and" should read -- on --.
Column 6, line 47, the word "member" should read -- members --.
Column 6, line 74, the word "carred" should read -- carried --.
Column 7, line 4, the word -- torque -- should appear after "said." Column 8, line 22, the word -- side -- should appear after "other." Column 10, line 47, the word "opening" should read -- openings --.

SIGNED AND
SEALED
MAY 5 1970

(SEAL)
Attest:

Edward M. Fletcher, Jr.
Attesting Officer

WILLIAM E. SCHUYLER, JR.
Commissioner of Patents